Patented Nov. 10, 1931

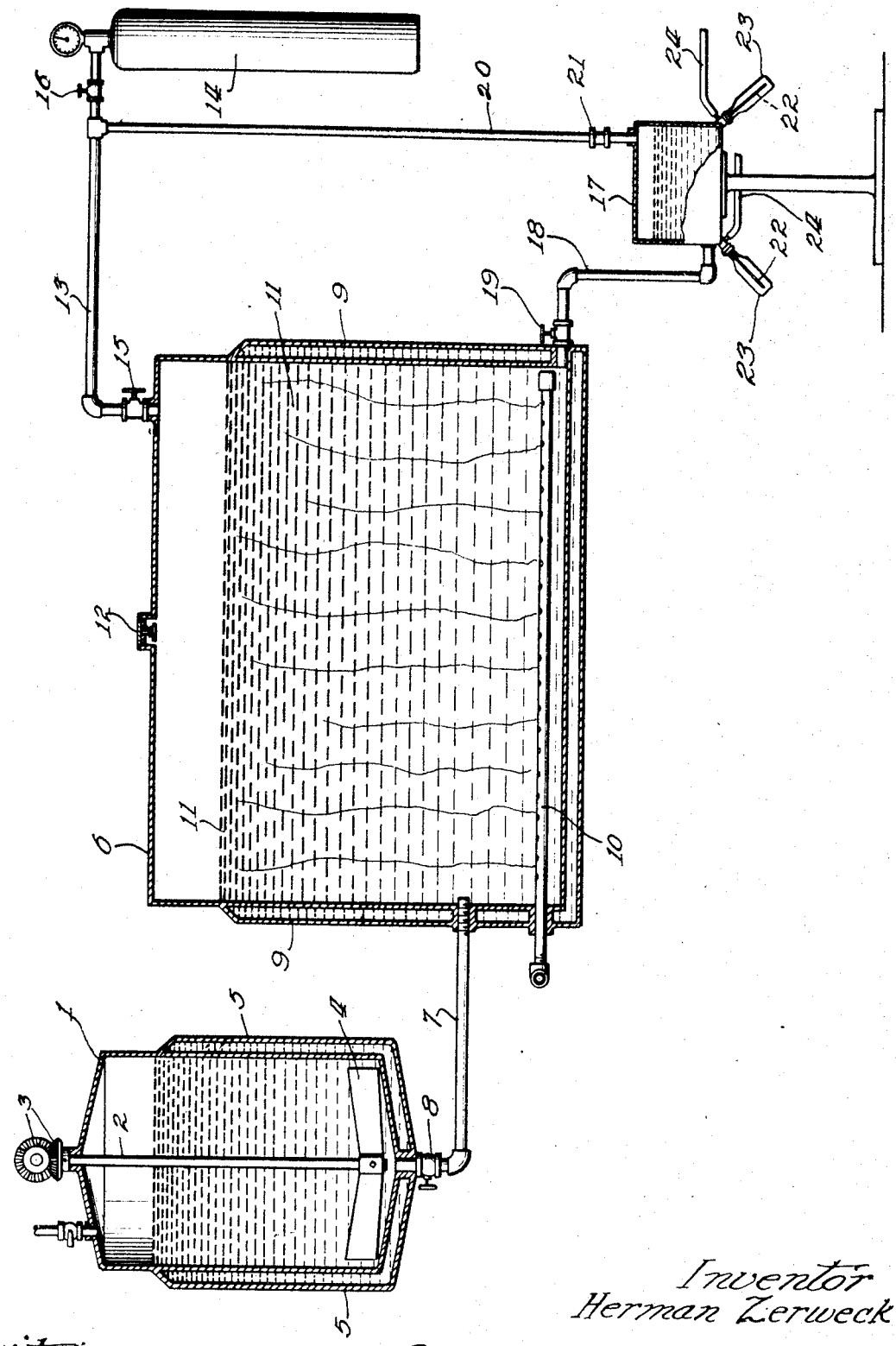

1,831,585

UNITED STATES PATENT OFFICE

HERMAN ZERWECK, OF CHICAGO, ILLINOIS

MINIM ALCOHOL BEVERAGE

Application filed April 4, 1930. Serial No. 441,612.

The main object of this invention is to produce a palatable yeast beverage having a high food value and a substantially negligible alcoholic content, which will remain as prepared and sealed for a reasonable length of time without resorting to pasteurization, or the use of chemical preservatives. The new and improved process for making a non-intoxicating yeast beverage has for its basis a rich, pure barley malt, or a fruit juice, and fresh thick yeast, which is preserved by the action of $CO_2$. The desired results are obtained by the careful preparation of the malt and the yeast, and by the systematic sterilization, refrigeration, agitation, the displacement and exclusion of air and saturation with $CO_2$.

Fresh yeast in liquid form, with a low alcoholic content has the characteristic of very easily and rapidly deteriorating, and the prevention or delay of the deterioration of the fresh yeast in the absence of alcohol is the basis of this invention.

Particular attention is paid to the fact that unfermented liquors containing grain, fruit or vegetable juices are very susceptible to infection from germs present in the air. For this reason my entire process is carried on in closed containers from which the air is excluded or exhausted, and $CO_2$ is substituted on account of its preserving qualities.

The apparatus required to carry out the novel features of my invention is shown in the accompanying diagrammatic drawing, which comprises a closed mixing tank 1 having a rotatable shaft 2 driven by gears 3 and an attached agitating propeller 4. An integral part of the mixing tank is a jacket 5, which provides means for temperature control.

The mixing tank 1 is connected to a closed treating tank 6 by a conduit 7, in which is an outlet valve 8. The treating tank has a temperature control jacket 9. Both jackets 5 and 9 are provided with fluid circulating means not shown. In the bottom of the treating tank is a perforated pipe 10 adapted to distribute $CO_2$ under pressure to the contained liquor 11. A combined check and safety valve 12 is located at the top of the treating tank. A conduit 13 connects the top of the tank with a $CO_2$ drum 14, with suitable control valves 15 and 16. The treating tank outlet is connected with a closed bottle filler 17 by a conduit 18 and control valve 19. The top of the bottle filler is connected to the pipe 13 through an equalizing pipe 20, which is also provided with a check valve 21. The bottle filler has a filler tube 22, which extends to the bottom of the bottle 23, and an automatic air vent 24, which is connected to an aspirator, not shown, to automatically remove the air from the bottle.

In operation, the materials are placed in the jacket tanks and sterilized by boiling, then chilled by refrigeration. The contents of the two tanks are then combined in the treating tank forming a malt liquor. A part of the malt liquor is then returned to the mixing tank and used as a thinner for thick yeast and finally the yeast and malt are fully combined in the treating tank in the presence of $CO_2$.

The first step in this process in the preparation of one hundred barrels of yeast malt beverage is sterilization by boiling. The outlet valve of the treating tank is closed and the connection between the mixing tank and treating tank is left open. Ninety-nine barrels of potable water is placed in the connected tanks and the levels adjusted so that there are nine barrels in the mixing tank and ninety barrels in the treating tank. The valve in the pipe connecting the two tanks is then closed. There is then added about 450 pounds of malt syrup to the mixing tank, making a total of approximately ten barrels in the mixing tank. Live steam is then admitted to the jackets of both tanks and the flow of steam continued until both tanks have been boiling for about thirty minutes. When the steam is shut off, the tanks are closed air tight.

The second step is refrigeration. A cooling fluid is admitted to the jackets of both tanks until the temperature has dropped to about 35° F. Both tanks are closed air tight when the steam pressure is cut off and the pressure is below atmospheric when the tanks are cooled, since substantially all of the air has been expelled by boiling.

The third step comprises mixing the contents of the two tanks and the substitution of $CO_2$ to take the place of the air expelled. When thoroughly cooled, the ten barrels in the mixing tank are forced into the treating tank and mixed by the admission of $CO_2$ through the perforated pipe in the bottom of the treating tank.

The fourth step is the preparation of the yeast. When the one hundred barrels of malt liquor in the treating tank have been thoroughly cooled and saturated with $CO_2$, the valve in the pipe connecting the two tanks is opened and five barrels of the contents are returned to the mixing tank. There is then added to the five barrels in the mixing tank from 300 to 500 pounds of cool fresh thick yeast. The propeller is put in operation to force the breaking up of all yeast lumps, care being taken to maintain the temperature at about 35° F.

When the thinned yeast mixture is completed, the final step comprises forcing the yeast into the malt liquor in the treating tank. The yeast and malt liquors are mixed and treated by $CO_2$ circulation and kept at a low temperature from two to three hours.

From the treating tank the unfermented liquor is conducted to a closed bottle filler where the bottling is accomplished by gravity, $CO_2$ pressure, and a vacuum in the container. From sterilization to the completion of the bottling operation, the liquor is continually protected from inocculation by air germs and is kept, so far as possible, under $CO_2$ pressure.

From the time the yeast is put in, the temperature is maintained at about 35° F. and throughout the operation, air has been eliminated and $CO_2$ pressure substituted when necessary. The result is that the liquor delivered to the bottles, having been kept in the presence of $CO_2$ and at low temperature, has not fermented. Fermentation takes place after the liquor is placed in the trade package and stored at room temperature. The presence of $CO_2$ in the liquor and the production of $CO_2$ in the trade package, both tend to check fermentation, the total amount of carbonation thus created amounts to from 0.4% to 0.5% of $CO_2$ in the beverage, and the corresponding alcoholic content will be less than one-half of 1 per cent.

Although but one specific embodiment of this invention is herein shown and described, it will be understood that numerous details of the construction shown may be altered or omitted without departing from the spirit of this invention as defined by the following claims:

I claim:

1. The process of manufacturing and bottling a minim beverage which comprises the sterilization and elimination of air by boiling in closed containers, the substitution of $CO_2$ for the air content, and means for eliminating air from the bottles substantially as described.

2. The process of manufacturing and bottling of a minim alcohol beverage which comprises taking one part malt syrup to nine parts water, sterilization by boiling of the thin malt syrup, sterilization of ninety parts of water, refrigeration under cover, followed by the mixture of the thin malt syrup with the sterilized water, forming a malt liquor, five parts of the chilled malt liquor added to one part of thick yeast and thoroughly mixed, injection of the thinned yeast into the malt liquor, treatment of the yeast malt with $CO_2$, and continuous refrigeration and bottling of the unfermented liquor saturated with $CO_2$ and free from air.

3. A process of manufacturing and bottling of minim alcohol beverages in closed containers from which air is excluded, which comprises mixing one part of malt syrup with nine parts of sterilized water, refrigerating the malt mixture, and adding ninety parts of sterilized and chilled air-free water, thus forming a thin malt liquor, then forming a thin yeast by mixing one part of thick yeast with five parts of said thin malt liquor, thus forming a yeast malt liquor, circulating and saturating the same with $CO_2$ and then transferring the unfermented liquor under $CO_2$ pressure to a trade package from which air has been extracted.

4. The process of manufacturing and bottling a minim alcohol malt liquor which comprises taking one part of malt syrup to nine parts of water, sterilizing the same by boiling, then sterilizing ninety parts of water, refrigerating the same under cover, mixing the thin malt syrup with the sterilized water, thus forming a thin malt liquor, then adding five parts of the chilled thin malt liquor to one part of thick yeast and thoroughly mixing the same, injecting the thin yeast into the malt liquor, treating the yeast malt liquor with $CO_2$ and refrigerating the same, and then bottling the unfermented liquor while saturated with $CO_2$ and free from air.

Signed at Chicago this 28th day of March, 1930.

HERMAN ZERWECK.